United States Patent
Narasimhan et al.

(10) Patent No.: US 6,446,192 B1
(45) Date of Patent: Sep. 3, 2002

(54) REMOTE MONITORING AND CONTROL OF EQUIPMENT OVER COMPUTER NETWORKS USING A SINGLE WEB INTERFACING CHIP

(75) Inventors: Subram Narasimhan, Saratoga; Curtis Allred, Cupertino; Mark Stemm, Berkeley, all of CA (US); Hari Balakrishnan, Winchester, MA (US)

(73) Assignee: Embrace Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/326,105

(22) Filed: Jun. 4, 1999

(51) Int. Cl.[7] .............................. G06F 9/54; G06F 6/45; G06F 13/42; G06F 15/173
(52) U.S. Cl. .............................. 712/29; 712/28; 712/31; 709/203; 709/230; 709/236; 709/211; 709/328; 717/118; 717/136; 717/148
(58) Field of Search ................................. 709/319, 320, 709/311, 332, 219, 210, 315, 329, 218, 203, 230, 224, 232, 226, 234, 236, 245, 250, 253, 328, 324, 211, 221, 209, 231; 235/462.15, 472.01; 712/217, 28, 30, 31, 29, 38, 32; 713/201, 167, 153, 165, 200, 151, 202; 702/122; 707/513, 501, 2, 103, 104, 5, 3, 10; 705/51.14, 54; 717/118, 136, 148

(56) References Cited

U.S. PATENT DOCUMENTS

| | | | |
|---|---|---|---|
| 5,761,430 A | * 6/1998 | Gross et al. ................. | 709/225 |
| 5,790,977 A | 8/1998 | Ezekiel ........................ | 702/122 |
| 5,905,248 A | * 5/1999 | Russell et al. ............... | 709/218 |
| 6,154,843 A | * 11/2000 | Hart, Jr. et al. ............. | 713/201 |

* cited by examiner

Primary Examiner—Daniel H. Pan
(74) Attorney, Agent, or Firm—Lumen Intellectual Property Services, Inc.

(57) ABSTRACT

A single integrated circuit chip interfaces device control circuitry of a device to a client machine via a computer network. The chip comprises an internal data bus; a central processing unit connected to the internal data bus; an internal memory connected to the internal data bus; a device interface connected to the internal data bus, wherein the device interface comprises circuit blocks for communicating digital information between the integrated circuit and the device control circuitry; and a network interface connected to the internal data bus, wherein the network interface comprises circuit blocks for communicating digital information between the integrated circuit and the computer network. The internal memory comprises instructions for implementing complete internet protocol functionality on the network; translating information between network protocol formats and a format of the device; transferring information between the network and the device control circuitry; and sending customized software to the client machine over the network, wherein the software is executable on the client machine, and wherein the software enables the client machine to generate device control signals and to receive device status information. The single integrated circuit chip provides inexpensive, compact, powerful, and versatile interfacing of a large variety of devices to high performance computer networks.

11 Claims, 12 Drawing Sheets

REMOTE MONITORING AND CONTROL OF EQUIPMENT OVER COMPUTER NETWORKS USING A SINGLE WEB INTERFACING CHIP

FIELD OF THE INVENTION

This invention relates generally to techniques for remote monitoring and control of equipment or devices over computer networks. More particularly, it relates to inexpensive, scalable, and robust techniques for monitoring and controlling many different types of remote equipment over computer networks from one or more locations.

BACKGROUND ART

There are many devices that need to be monitored or controlled remotely, such as security system devices and industrial equipment. In addition, many other devices, such as environmental controls and various appliances and consumer electronic equipment, would be more convenient to use if they could be remotely controlled or monitored over computer networks. Remote monitoring could also provide fast and inexpensive diagnosis of device malfunction by manufacturers. Present techniques for providing such remote control and, monitoring, however, are very expensive to implement and are only practical for large industrial applications. In addition, present techniques typically require complicated installation and maintenance, further adding to the overall cost.

U.S. Pat. No. 5,790,977 to Ezekiel discloses a technique providing access to an instrument over a computer network by a remote host system. According to the technique, the instrument stores control and data acquisition software (such as a Java applet), which is sent over the computer network to the remote host system. The software is then executed on the remote host system (e.g., by a Java-enabled http browser) and enables the remote host system to generate and send to the instrument various data acquisition control signals. In response, the acquisition of data by the instrument is controlled, and acquired data may be sent over the computer network to the remote host system. The software on the remote host provides a graphical user interface that allows the user to interact with the instrument. The interface displays acquired data from the instrument as well as virtual instrument controls. This method of remote access, however, is expensive to implement and maintain. A conventional implementation of the disclosed technique would require an instrument that has a full scale web server including a powerful microprocessor, large memory and disk storage capacity, network hardware and software, powerful operating system, and custom application hardware and software to provide communications interfacing with the instrument. In addition, the server needs expensive custom hardware and software for use with the particular instrument. This solution, therefore, is not practical for low-cost instruments or devices.

One prior art solution shown in FIG. 1A involves the use of a web server gateway machine 20 at the remote location. The web server machine 20 is a full scale workstation including a powerful microprocessor, large memory and disk storage capacity, network hardware and software, powerful operating system, and custom application hardware and software to provide communications interfacing with various devices at the remote location. The remote devices 22 are provided with separate application specific integrated circuit (ASIC) chips 24 that interface the device control circuitry hardware 26 with a lightweight local communication link 28 to the server 20. Clients 30 are connected to the server 20 via a high performance computer network 32. Information for control and monitoring is thus communicated between the clients 30 and the devices 22 via the network 32, server 20, and lightweight local link 28. This system has the disadvantage that the powerful gateway server machine 20 can be very expensive to purchase, install, and maintain. The system architecture of this approach also has the disadvantage that it is vulnerable to failures in multiple points: at both the server gateway 20 and at the ASIC chip 24 embedded in each device. In addition, because the gateway server 20 provides the single point of access to all the devices 22 at the remote location, access to all the devices is lost when the gateway server fails. This particular disadvantage could be avoided by embedding the gateway server itself in each device. Such a solution, however, is very expensive since it requires a complex and expensive server for each device.

OBJECTS AND ADVANTAGES

In view of the above, it is an object of the present invention to provide an improved apparatus and method for providing remote controlling and monitoring of a device over a computer network. In particular, it is an object of the present invention to significantly reduce the complexity and size of remote monitoring systems, and to dramatically simplify the installation and maintenance of remote control and monitoring systems. It is another object of the invention to minimize the number of points of failure in remote control and monitoring systems. Yet another object of the invention is to provide an inexpensive generic and versatile apparatus that enables any device to be remotely monitored and controlled, without requiring expensive customized hardware. Another object of the invention is to provide such an apparatus that permits easy software customization. Other objects and advantages of the invention will become evident from consideration of the following description and associated drawings.

SUMMARY

The present invention provides a method and apparatus for remotely monitoring and controlling devices or equipment over a computer network. In contrast with prior solutions that require large and expensive web server machines, the present invention requires only a single, inexpensive integrated circuit chip. Remarkably, this single network interface chip provides all the networking hardware, networking software and device interface elements necessary for network connectivity and web-based or network-based management of any device. It also enables monitoring and controlling of any device, regardless of its available processing power, code space, or interface pins. Even devices without a CPU or microcontroller are supported.

Because all the required functionality of a large web server machine is included in the single network interface chip, the present invention provides remote monitoring and control of devices at a fraction of the cost of prior solutions. As a result, whereas the cost and complexity of prior remote access and control systems limited their use to large scale industrial applications and expensive equipment, the present invention suddenly enables virtually any device to be economically networked so that it may be remotely monitored and controlled. Such devices include, but are not limited to, home appliances, vending machines. digital cameras, security systems, copiers, printers, fax machines, point-of-sale terminals, automobiles, and robots.

The network interface chip of the present invention is a generic and versatile chip that is able to connect to any device using serial, parallel, or customized I/O. Although the chip is generic, it can easily be customized for a particular device by storing programs and/or configuration codes in a portion of its on-chip memory. Alternatively, or in addition, additional customized programs and/or configuration codes may be stored in a second chip.

In contrast to prior art embedded chips that require an expensive intermediary web server machine in order to connect the device to the internet, the network interface chip of the present invention provides complete internet enablement without any expensive web server machine. The chip alone is a fully functional internet node, including a web server, and supporting various protocols and hardware connections. Specifically, this single chip provides integrated ethernet connections, provides wired or wireless modem connections, fully supports standard IP-based network protocols such as TCP/IP, PPP, UDP, DHCP, SMTP, FTP and HTTP. The chip also supports Java and standard network security techniques. Because this single chip is the only link between the remote device and the Internet, it provides an extremely simple and inexpensive solution to remote monitoring and control. The simplicity of this direct interface has the additionally important benefit that the number of possible points of failure between the device and the network is minimized. Prior art solutions, in contrast, typically have multiple intermediary devices, such as gateway servers in combination with device interface hardware.

In one aspect of the invention a single integrated circuit chip is provided for interfacing device control circuitry of a device to a client machine via a computer network. The chip comprises the following components: an internal data bus; a central processing unit connected to the internal data bus; an internal memory connected to the internal data bus; a device interface connected to the internal data bus, wherein the device interface comprises circuit blocks for communicating digital information between the integrated circuit and the device control circuitry; and a network interface connected to the internal data bus, wherein the network interface comprises circuit blocks for communicating digital information between the integrated circuit and the computer network. The chip comprises instructions and/or hardware for implementing complete internet protocol functionality on the network; translating information between network protocol formats and a format of the device; transferring information between the network and the device control circuitry; and sending customized software to the client machine over the network, wherein the software is executable on the client machine, and wherein the software enables the client machine to generate device control signals and to receive device status information.

In a preferred embodiment of the invention, the memory contains customized device network address information and customized device interface port protocol information. The chip of this embodiment further comprises an external memory interface circuit block, wherein the internal memory comprises instructions for reading the customized software from an external memory via the external memory interface circuit block. The software comprises bytecode instructions (e.g., Java bytecode applet) executable by an interpreter running on the client machine (e.g., a Web browser with a Java Virtual Machine), wherein the bytecode instructions are customized to characteristics of the device, and wherein the bytecode instructions generate on the client machine a virtual interface with the device. The chip of this embodiment is also characterized in that the device interface comprises an asynchronous serial port, a synchronous serial port, a parallel CPU bus interface, and a programmable input/output port. The network interface comprises an ethernet MAC and an asynchronous serial port. The chip comprises instructions and/or hardware for implementing the network protocols and functionality of TCP/IP, UDP/IP, FTP, SMTP, and HTTP. The chip also comprises instructions and/or hardware for implementing an application programming interface (API) with the device. These and other features are implemented in a single integrated circuit chip providing inexpensive, compact, powerful, and versatile interfacing of a large variety of devices to computer networks. These and other advantages of the invention will become apparent from the following description and accompanying drawings.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1A:
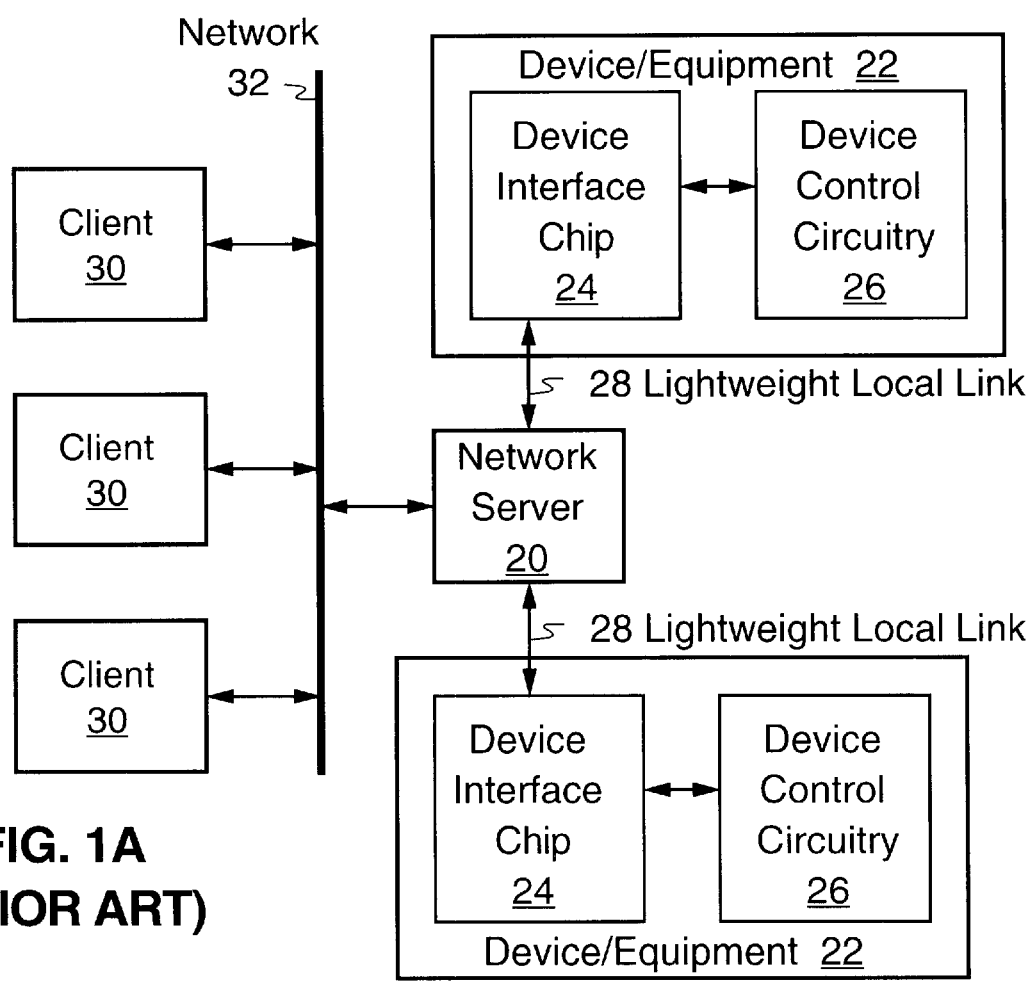
FIG. 1A illustrates a system architecture involving the use of a web server gateway machine at the remote location, according to the prior art.
Figure 1B:
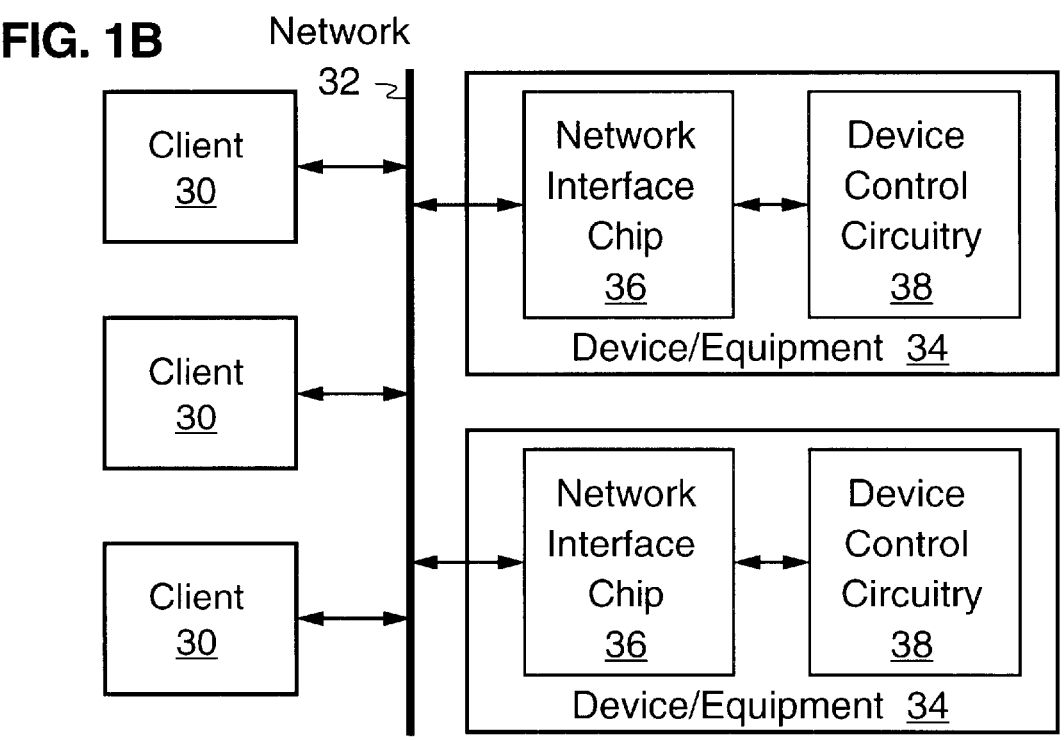
FIG. 1B illustrates a system architecture involving a direct interface between devices and the internet according to a preferred embodiment of the invention.

A system for interfacing a device directly to the internet according to a preferred embodiment of the invention is shown in FIG. 1B. In contrast to the prior art architecture shown in FIG. 1A, the architecture of the present invention links the remote device/equipment 34 directly to the high performance network 32 without any expensive intermediary server machine. In addition to reducing cost and complexity, this system architecture has the important advantage that it provides higher reliability by virtue of its simplicity. It also provides higher reliability because access to each device is direct and does not depend on access to a separate gateway server machine. In contrast with prior solutions that require large and expensive web server machines, the present invention requires only a single, inexpensive integrated circuit chip 36 that provides a direct link between the device control circuitry 38 and the network 32. Clients 30 connected to the network 32 are able to monitor and control the devices 22 via direct connections over the network 32. The devices 34 can be selected from a wide variety of device types, from very expensive large scale industrial equipment to inexpensive small scale consumer electronic devices. Different device types will often have different types of device control circuitry 38. Some devices will have sophisticated control circuits that contain microprocessors or microcontrollers, and equally sophisticated electronic interfacing capabilities. Other devices will have simpler control circuits with little or no sophistication. Accordingly, the network interface chip 36 has the ability to communicate with sophisticated devices through standard parallel and serial interfaces, as well as the ability to communicate with simple devices through a programmable parallel interface. The network interface chip 36 can be permanently installed in the equipment 34, or it can be attached externally to the equipment as part of a module.

The client 30 can be as simple as an industry standard Web browser. In this case, the present invention gives the designer many software choices for equipment control and user interface implementation. The user interface or virtual control panel displayed on the browser may be an HTML page, or a Java applet. In either case, graphics, buttons, indicators, etc., may be used to simulate the equipment's control panel or actual appearance. When the client 30 connects to the network interface chip 36 on the remote equipment 34, the virtual control panel is loaded into the browser giving the client remote access to the equipment. If the virtual control panel is a Java applet, the Web browser's Java virtual machine is used to run the applet and display the virtual control panel.

A web browser or Java virtual machine (JVM) is not required, however, for the client 30 to access a device 34. The present system supports use of additional standard internet capabilities and protocols. Therefore, custom client software can access the equipment directly using standard "sockets". Such software can be developed using conventional programming tools, e.g., BSD Sockets (Unix) or Winsock (Windows). The client 30 also could be an automated application program that collects data from remote devices 34 via the Internet 32. In this way a single client could collect usage data and control thousands of remote devices. The data collected by such a client could be used to generate usage and maintenance reports. The client software in this case could be written in Java or C/C++ using libraries, and it could bridge to other applications such as databases and diagnostic software to provide powerful services based on device control and monitoring functions.

The network 32 could be the Internet, a local area network (LAN), an intranet, a point-to-point connection over a wired or wireless modem, or any combination of these or other conventional networks. Although the Internet allows the device to be accessed from anywhere in the world, it is not necessary to use the Internet. The network could also be a physically isolated network, a sub-network isolated from the Internet, or a subnet isolated by a bridge or firewall. The network also could be as simple as two devices connected by an RS-232 serial line. In general, any TCP/IP transmission medium may be used for the network, and any internet protocol (IP) compatible devices may be used as clients. In the preferred embodiment, the network interface chip 36 supports modem and Ethernet types of network connections. These two basic interfaces can be used to support communication over a wide variety of physical media, including wires, cables, phone lines, and power lines, optical fibers, and wireless radio channels.

The device control circuitry 38 implements the main functionality of the device 34, but typically has little or no networking capability. For example, the circuitry 38 may have a small 4 or 8 bit microcontroller with insufficient processing power, memory, or pins to support networking, or it may have no processor, only switches, indicators, and sensors. The circuitry might also include a 32-bit RISC or CISC processor, or even a DSP. The device control circuitry 38 is quickly and easily connected to the network interface chip 36, thereby allowing the device to be easily connected to the internet for remote control and monitoring. The present invention, therefore, allows legacy devices that have no networking capability to be easily networked through the installation of a single chip. It also provides a quick and inexpensive way to connect many new devices to the Internet.

The network interface chip 36 is a single integrated circuit that connects to the control circuitry 38 of virtually any remote device 34 and implements all networking services required to interface the device with a high performance computer network 32 for remote control and monitoring by one or more clients 30. Standard TCP/IP provides the transport and network layers for passing data between the equipment 34 and the remote client 30. TCP/IP. is the standard Internet protocol and provides a reliable transport which handles all the necessary handshaking, error-checking, and re-try algorithms to guarantee data delivery and integrity. The resulting interface to the Device Control Circuitry 38 is a simple, easy to use data exchange. The device 34 is not burdened with the overhead of network processing. Likewise, the system designer need not be burdened with understanding the intricate complexities of the networking protocols.

Ethernet and serial PPP protocols are supported at the datalink layer of the device interface chip 36, giving the designer a choice of many physical network media including 10/100Base-T, Modem, Serial, and RF. An enhanced Web Server (HTTP) and E-mail Client (SMTP) are built into the chip 36, allowing a variety of client interfaces to be offered which utilize standard web browsers and e-mail readers. Because Internet standards are used, no additional software is required by the client 30. Built-in security insures all users are authenticated. The flexible web interface to the device makes it very easy to integrate into existing designs as well as new ones.

The network interface chip 36 supports the most widely used Internet protocols and standards:

Internet Protocol (IP): Standard Internet network layer providing destination addressing and routeability.

Transmission Control Protocol (TCP): Standard Internet transport layer. Provides a reliable data stream.

User Datagram Protocol (UDP): A secondary transport layer providing a packet based transport.

Hypertext Transfer Protocol (HTTP): Application layer protocol used primarily for Web pages. The network interface chip is an HTTP server.

Hypertext Markup Language (HTML): HTML is the format used by Web documents for display on the user's Web browser.

Point to Point Protocol (PPP): Most widely used Datalink protocol for use over serial and phone lines.

Simple Mail Transfer Protocol (SMTP): Standard Internet protocol for sending mail.

Dynamic Host Configuration Protocol (DHCP): An initialization protocol which allows a device to receive configuration parameters and boot data from a DHCP server.

File Transfer Protocol (FTP): File Transfer Protocol is the Internet standard for downloading and uploading files between devices.

Ethernet: Most widely used physical networking media for local area networks (LAN). Defines Datalink and Physical layers.

Access to these protocols is provided to the device 34 via a simple, low overhead interface. The chip's complete Internet Protocol implementation offloads the complex network processing and real-time requirements from the device control circuitry 38. The network interface chip 36 offers many configurations for both the network side and the equipment interface side. Any application and device architecture can be supported by choosing the appropriate combination of features and interfaces.

Figure 2:
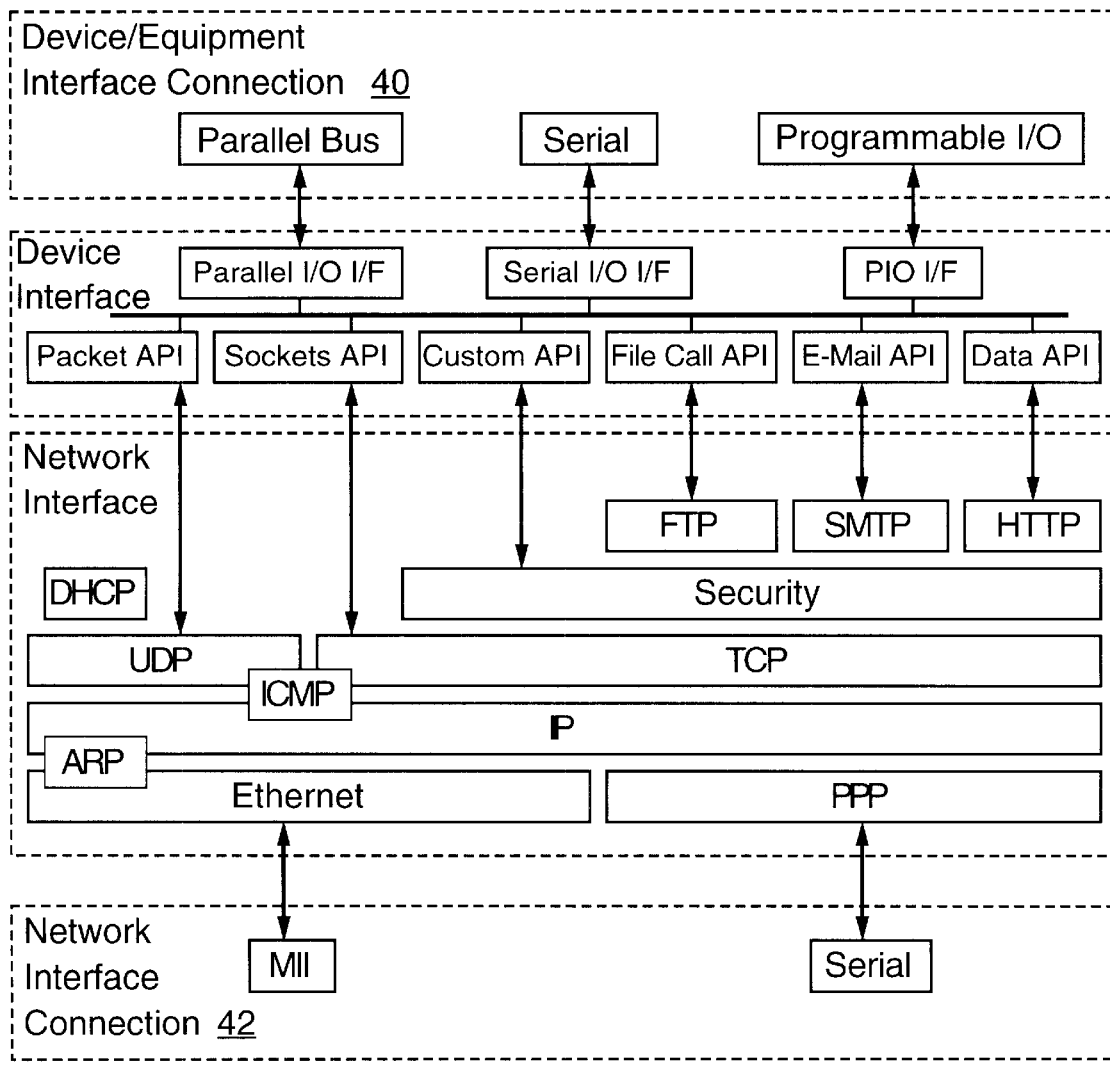
FIG. 2 shows the device-side and network-side interfacing functionality of a network interface chip according to the present invention.

FIG. 2 shows the internal functionality of the network interface chip 36 and the primary external interfaces. The two primary connections to the chip are the Device Interface connections 40 which connect to the device control circuitry 38, and the Network Interface connections 42, which connect to the physical interface circuitry of the network 32. Both connections are flexible, allowing many design options to fit any application and host device architecture. The Device connections 40 support serial, parallel, and general purpose I/O. The Network connections 42 may be made through various wired and/or wireless media through Media Independent Interface (MII) and asynchronous serial interfaces. The chip also has an interface for an optional EEPROM/Serial Flash which may be used to store chip configuration values, HTML pages, and bytecode for the client interface. If the EEPROM is not present, the chip may be configured from a device processor. The EEPROM and chip configuration will be described in more detail later.

As is evident from FIG. 2, the functionality of the chip is provided by a versatile collection of layered protocols. The network connections 42 are linked to the core IP layer by Ethernet and PPP blocks. On the other side of the core IP layer are UDP and TCP layers that link the IP layer with other protocol layers and device interface modules. The UDP layer is linked directly with a Packet API module and the TCP layer is linked directly with a Sockets API module. On top of the TCP layer is a Security layer that provides standard security functionality, e.g., implemented as a secure sockets layer (SSL) or transport layer security (TLS). FTP, SMTP and HTTP layers sit on top of the security layer, linking it to File Call API, E-Mail API, and Data API modules, respectively. The security layer is also linked directly to a custom device interface module. The various modules just mentioned are all connected to several device-side modules. A Parallel I/O interface module provides parallel bus functionality, a Serial I/O interface module provides standard serial input/output functionality, and a Programmable I/O interface module provides general purpose input and output interface functionality with the device. These modules communicate with the device control circuitry over device interface connections 40, which include serial, parallel, and programmable I/O connection interfaces.

Figure 3:
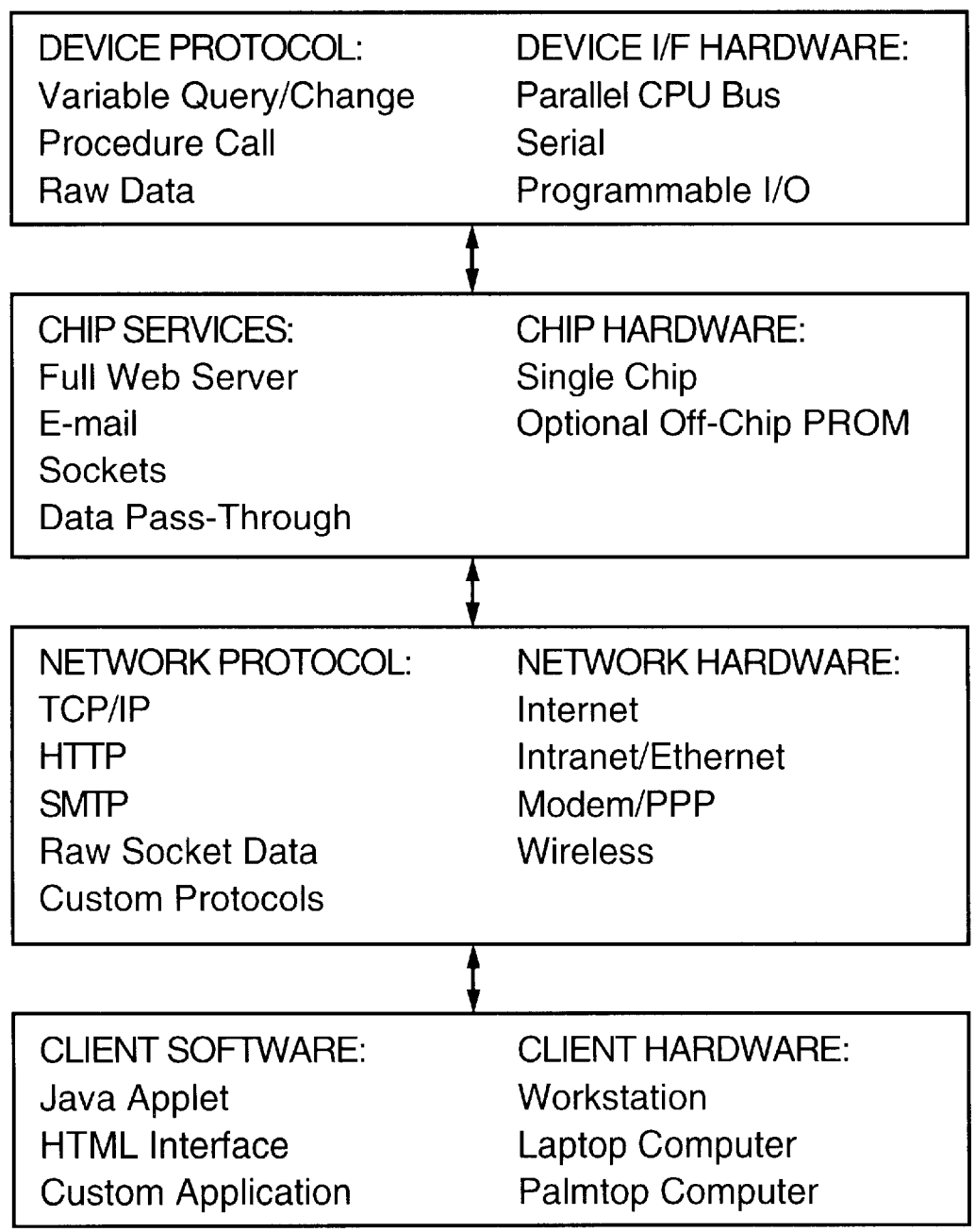
FIG. 3 illustrates the wide variety of system configurations and options supported by a network interface chip of the present invention, allowing it to adapt to many applications and device architectures.

The preferred embodiment of the present invention supports a wide variety of system configurations and options to adapt to any application and device architecture. FIG. 3 illustrates this flexibility. The client hardware, for example, may be a workstation, laptop computer, palmtop computer, or other similar device. The software running on the client hardware can be a standard browser program supporting HTML, a Java virtual machine for executing Java applets, or any other bytecode interpreter capable of running the bytecode supplied by the chip. The software on the client may also be a custom application program installed on the client, or downloaded from the network interface chip. The network hardware can be any combination of the internet, and intranet/ethernet, modem/PPP, and wireless communication connections. These network connections may be running any of various combinations of protocols, such as TCP/IP, HTTP, SMTP, Raw Socket Data, and to Custom Protocols. The network interface chip may be implemented as a single chip with on-chip memory, or may be a single chip with supplementary off-chip PROM or ROM. The chip provides the functionality of a full web server, supports e-mail and sockets, as well as a direct data pass-through mode. The device or equipment may be any type of electronic and/or mechanical hardware, provided it has some form of electronic device control circuitry, however rudimentary or sophisticated it may be. For example, the device control circuitry may be as simple as a single binary status line, or as complex as a CPU bus. More typically, the control circuitry will be a parallel bus or serial port. The device protocol has an equally large range of possibilities. It might be a raw data protocol, procedure call protocol, or a variable query/change protocol. The above examples of hardware, software, protocols, and functionality, are by no means exhaustive. Many others can be used with the present invention as well.

The network interface chip gives the designer many software choices for client software implementation and device control. For example, device control solutions typically will use one or more of the following methods:

HTML based control: Uses the standard Web server, Web browser model. HTML pages implement a client control panel, and HTTP is the communication protocol.

Java Applet based control: Uses Java Applets to implement the client control panel and the communication protocol.

Custom client applications: Custom client software installed on the client allows remote device monitoring and control without requiring a Web browser or JVM at the client.

Java and HTML control are based on the use of standard Internet browsers such as Netscape's Navigator™ and Microsoft's Internet Explorer™. Java provides the most flexibility and control as well as superior Graphical User Interface (GUI) capabilities. HTML, on the other hand, has the advantage of not requiring a Java Virtual Machine (JVM) at the client. These three methods will now be described in more detail.

Java Based Control

Java based control uses Java Applets and the client's JVM to implement the client user interface and communications between the client and network interface chip server. A "virtual control panel" Java applet is created to provide the user of the client to remotely monitor and/or control the remote equipment. This applet is designed with a graphical user interface that has the appropriate look and feel for the remote equipment. The custom applet may conveniently be created using communication and graphics libraries which allow rapid applet development. The compiled applet is then programmed into the network interface chip memory, or an off-chip memory. When the device is connected to the network via this customized network interface chip, a remote client can connect to the chip by providing a uniform resource locator (URL). Upon connection, the device's applet is downloaded into the client's JVM and renders the control panel on the client's screen. The activation of buttons and controls on the panel are translated into commands by the applet and transmitted to the network interface chip. These commands are interpreted by the network interface chip, which then exchanges data with the equipment's device control circuitry. The data exchange may be, for example, a simple query of a value, or a request to change a value.

HTML Based Control

HTML based device control is similar in many ways to Java control, except that the control panel is created as an HTML "Web page", and the communication protocol is standard HTTP. The HTML pages are programmed into the network interface chip, just as the applet is in the previous method described above. Within the HTML page are special HTML tags that indicate locations where status information from the host device is to be obtained and inserted. With the network interface chip installed, the device becomes a web server with some unique features. When a remote client connects to the device and requests its "home page", the network interface chip serves the HTML control panel to the client while replacing the special HTML tags with the current data values from the equipment. If the client changes a setting on the control panel, the new value is sent to the device using the HTTP protocol. The network interface chip receives the new value and communicates it to the device.

Custom Client Software

Custom client software based control may also be implemented in the context of the present invention. This approach does not require a Web browser or JVM. This may be useful for dedicated-use clients, or for data collection servers which automatically query thousands of devices on the Internet, gathering statistics for post processing and analysis. Custom clients may be created using any language that supports standard Internet Protocol socket programming, and may be conveniently created using Java and C/C++ libraries.

In general, the Internet does not provide a secure environment. Many techniques exist for providing network security at various levels in the hierarchy of protocols. The preferred embodiment of the network interface chip provides security through login authentication. Only authorized users may connect to the equipment and access the internal functions. Upon connection, the user is prompted for a password. If the password is not correct, the connection will be refused. In addition, standard data encryption and message authentication are provided in the preferred embodiment.

Figure 4:
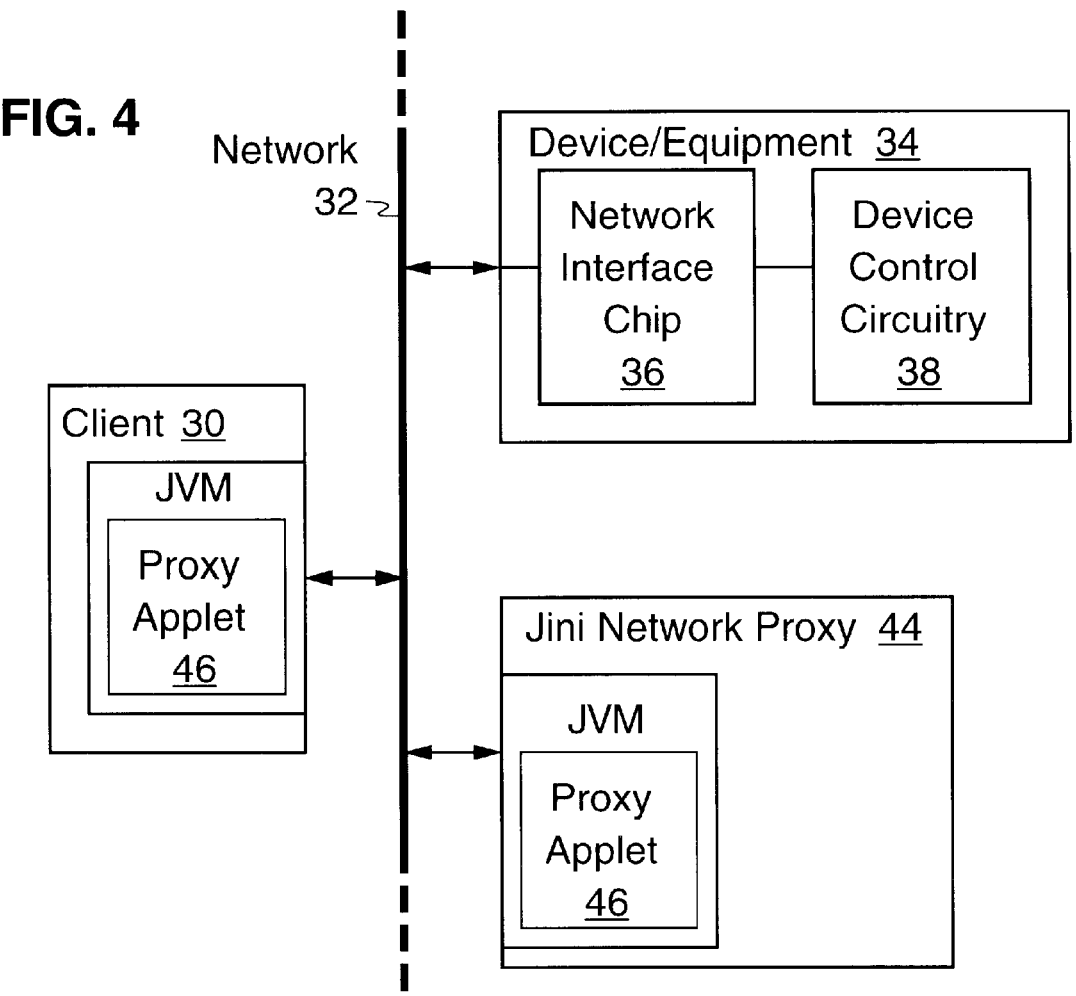
FIG. 4 illustrates a system according to the present invention using a "Shared Virtual Machine" topology.

The network interface chip is compatible with network systems incorporating Sun Microsystem's Jini™ technology. Jini™ is a system by which networked devices can "discover" each other and have access to each other's resources and services. As shown in FIG. 4, a device 34 enabled with a network interface chip 36 is compatible with the "Shared Virtual Machine" topology as defined in the Jini™ Device Architecture Specification (Version 1.0DC). In this configuration, a central proxy server 44 on the network 32 provides the discovery and registration with the lookup server. When a client 30 wishes to use the services of the network interface chip enabled device 34, the lookup server provides the client an applet 46 that allows the client to access the device's services. The function of the lookup server is to provide a central service by which other devices on the network can find what services are available, and find out how to locate those services. Normally, each device which provides a service to the network must register its service(s) in the lookup server. This registration process places a significant burden on the device, requiring expensive hardware. In the configuration of the present invention, however, the proxy server registers with the lookup server on behalf of the device 34, thereby offloading the burden and simplifying the hardware requirements of device 34. Proxy server 44 may provide this registration service for a multitude of small devices on the network.

A great number of network and protocol variations are available when designing with the present system. In most cases, the network enabled device must operate in many network environments. This is a major advantage of the present system. Because it is based on established Internet standards, it will operate in almost any network environment. The network could be the Internet, an Intranet, a Local Area Network (LAN), a point-to-point connection over a modem, or any combination of these. Any network topology and medium which supports IP at the client, supports IP at the device, and provides a means to deliver data from one end to the other is sufficient. The network between the client and the device may actually traverse many network types such as LAN's, modems, fiber, ATM, TI, ISDN, and DSL. On the other extreme, the network could be isolated from the Internet. For example, the client could connect directly to the device over a phone line, using PPP. In this case, the communication link is a private connection, not subject to Internet traffic and security issues. If the client and device are in close proximity, the network could be simply a cable connecting the two, using PPP or other known protocols as the link layer. Though not connected to the Internet, these two examples still take advantage of Internet Protocols to implement a reliable connection between the two devices, and provide ready-to-use application level services. As discussed above in relation to in FIG. 2, standard Internet protocols used by the present system are TCP, UDP, and IP. Many higher level protocols ride on TCP/IP or UDP/IP. Higher level protocols like HTTP, FTP, and SMTP use TCP or UDP as the transport. Custom protocols which use TCP/IP or UDP/IP can also be used with the present invention. These would also be Internet compatible. As long as both ends of the connection can interpret the data, the custom protocol can operate in the present system.

As shown in FIG. 2, the network interface chip integrates an IEEE 802.3 compliant Ethernet MAC. The physical layer interface connection is MII. a standard interface for Ethernet and other physical layers, and is independent of the physical media. Common media include 10/100Base-T twisted pair, 10/100Base-2coax, and the emerging phoneline standard (HomePNA). All that is required to hook up to the physical media are the appropriate drivers, passives, and connectors. For modem and serial line networks, an asynchronous serial port is also provided on the network side. PPP is implemented by the network interface chip for dial-up connections. The interface connection in this case is logic level RS-232 signals: TxD, RxD, CTS, RTS, and CD allowing easy hookup to any embedded modem chip or module, or an external modem.

The preferred embodiment of the network interface chip can operate in one of two fundamental modes:

Data Pass Through: network interface chip passes data transparently between the device and the Internet.

Network Peripheral: The device interfaces to the network interface chip through an API, allowing the device access to more functionality and services.

In Data Pass Through mode, the network interface chip operates in a transparent mode. In this mode the network interface chip may be thought of as an Internet modem. Like a modem, the network interface chip converts network data to a byte stream over a serial or parallel interface. Bytes written by the remote client show up on the receive channel of the device. Bytes written to the transmit channel on the device show up at the remote client. New or existing protocols may be utilized which are independent of the physical layer hardware. In this mode, the network interface chip can be a web server, or simply accept socket connections from clients. In either case, the network interface chip manages connections from remote clients automatically, requiring no intervention from the device control circuitry. The only interaction between the network interface chip and the device is the transfer of the client's data. This mode has the restriction that only one client may be "connected" at a time. If other clients attempt to connect to the equipment, they will receive a busy response.

The Network Peripheral with API mode is considerably more sophisticated. For systems needing more functionality than pass-through mode offers, the network interface chip can act as a slave peripheral with a command based API (Application Programming Interface). As a peripheral, the network interface chip's API gives the equipment access to services such as e-mail, Sockets, and a monitoring and control protocol. These services enable the device to give Web access to the system's internal variables and functions, send e-mail notification, and can even manage multiple clients. As shown in FIG. 2, the network interface chip has a variety of modules in its device interface, implementing an API with many commands to accommodate a wide variety of applications and methods of network interfacing. All of these commands use a common protocol that is simple and efficient, requiring minimal programming and processor overhead to support. Although there are many commands in the API, a given application will use a small subset of the available commands, depending on the style of interface and communication chosen by the designer. The commands are divided into groups according to the service classes. For a given application, the designer will typically choose one of the following methods of network access and use only the class of commands associated with that method:

Monitoring and Control Interface: This API subset provides the remote client the ability to query and change values (i.e., variables) in the device.

E-mail Interface: This API implements E-mail transmission using SMTP. E-mail messages may be used to notify recipients of events in the device.

Sockets Interface: The sockets API implements a BSD Sockets type interface. This sets up a full-duplex data stream between the remote client and the device. It provides ultimate flexibility for implementing more sophisticated client or server applications and moving large amounts of data.

Datagram Interface: This is a simple packet-based interface using the UDP transport. It allows packets of data to be sent to and received from remote clients.

Remote Procedure Call Interface: This API subset provides the remote client the ability to make procedure calls (i.e., execute functions) in the system.

FTP: File Transfer Protocol is the Internet standard for downloading and uploading files between devices. Files are stored in the host equipment's file system. The network interface chip handles all the FTP server functionality, interrupting the host processor only to read or write a file.

HTML Page Mode Interface: The network interface chip currently can act as a Web server, serving pages stored in an external EEPROM. HTML pages may be stored in the main memory of the host equipment's processor. The network interface chip will request a specific page, and the equipment processor will retrieve the page from memory and write it to the network interface chip.

The Device Interface of the network interface chip has several interface modules that provide flexible, easy to use interface functionality between the chip and the device, accommodating a variety of applications and system architectures:

Asynchronous Serial Interface: A standard RS-232 type interface provides the simplest interface requiring minimal interface pins and no external logic. Either pass through or API mode may be used.

Parallel Bus Interface: Using the Parallel Bus interface, the network interface chip becomes a peripheral on the equipment's processor data bus. Alternatively, it can be connected to an 8 bit data port, DMA, or memory arbiter. This interface is much higher performance than the Serial Interface. It is a generic 8 bit bus which is compatible with any processor bus. Either pass through or API mode may be used.

Programmable I/O: This mode is for systems with no processor. A set of configurable general purpose digital I/O's are available to connect to signals in the system. Remote access to the I/Os is provided through the network interface chip's built-in Web server.

Figure 5:
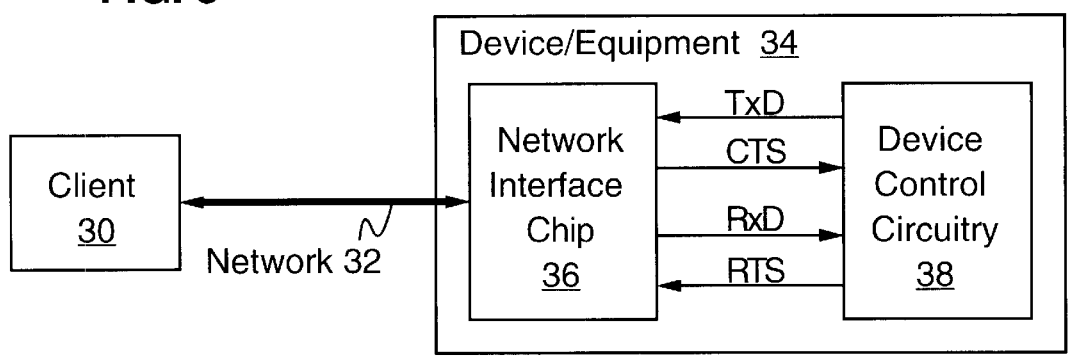
FIGS. 5 and 6 illustrate an asynchronous serial interface of the present invention operating in a pass through mode (FIG. 5) and an API mode (FIG. 6).
Figure 6:
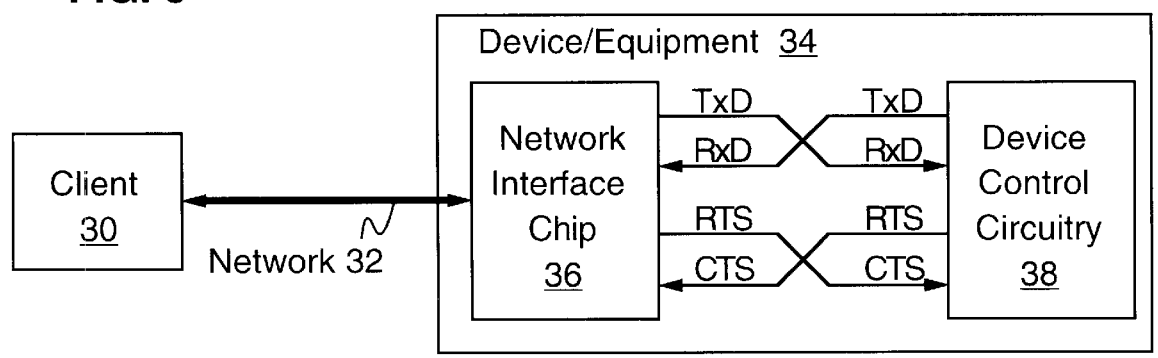

The Asynchronous Serial Interface mode supports both Pass Through and API modes of operation. As shown in FIGS. 5 and 6, the two modes have slightly different hardware interfaces. In the pass-through mode shown in FIG. 5, the network interface chip 36 may be thought of as an Internet-to-serial converter. Data is transferred over the Internet between the remote client 30 and the equipment 34 and passes transparently through the network interface chip 36. Bytes written by the remote client 30 show up on the data receive channel (RxD) of the device control circuitry 38. Bytes written to the data transmit channel (TxD) from the device control circuitry 38 show up at the remote client 30. Serial handshaking signals CTS and RTS are normally used to coordinate the data flow. New or existing protocols may be utilized which are independent of the physical layer hardware. This mode has the restriction that only one client may be "connected" to the device at any particular time. If other clients attempt to connect to the device, they will receive a busy response. This mode is most attractive for equipment which already incorporates an RS-232 asynchronous serial port for communications. For these devices, the network interface chip simply replaces the high voltage drivers on the serial line. No other device hardware or software modification is necessary because the same data and protocol are simply transferred over the Internet. In the Serial Pass-through mode, the network interface chip interfaces to the equipment through a full-duplex asynchronous serial interface. For low throughput devices, the interface may use as few as two pins on the equipment's processor (in asynchronous mode). For higher throughput, two additional pins (CTS and RTS) are needed for flow control.

In this mode, the network interface chip acts as the Data Communication Equipment (DCE) according to the standard RS-232 nomenclature. Therefore Transmit Data and Receive Data are defined from the perspective of the device transmitting to or receiving from the network. Thus, as shown in FIG. 5, the TxD line output from the device connects to the network interface chip's TxD input. The network interface chip's RxD output connects to the device's RxD input. Clear To Send (CTS) provides flow control for transmit data, and Request To Send (RTS) provides flow control for receive data.

The API Mode will now be discussed in relation to FIG. 6. For systems which have few interface pins available, but need more functionality than the serial pass-through mode offers, the network interface chip 36 can function in API mode as a peripheral with a serial interface. With a two wire interface (TxD and RxD), the device 34 has full access to the network interface chip's API. In this mode, the network interface chip 36 can function as a Web server, e-mail client, or a standard socket interface. These services provide Internet capabilities to the equipment's internal variables and functions, such as allowing the device to send e-mail notification, and even managing multiple clients. The API is a simple, efficient command protocol that gives the device powerful Internet access capabilities with minimal hardware and software overhead.

In this mode, the network interface chip 36 acts as the DTE (Data Terminal Equipment) according to the standard RS-232 nomenclature. Therefore Transmit Data and Receive Data are output and input respectively. As shown in the figure, the TxD line output from the device circuitry 38 connects to the RxD input of the network interface chip 36. The TxD output of the network interface chip connects to the RxD input of the device circuitry. From each side of the serial channel, Clear To Send (CTS) provides flow control for transmit data, and Request To Send (RTS) provides flow control for receive data. Therefore the CTS and RTS are also cross coupled, like the data lines, as shown.

Figure 7:
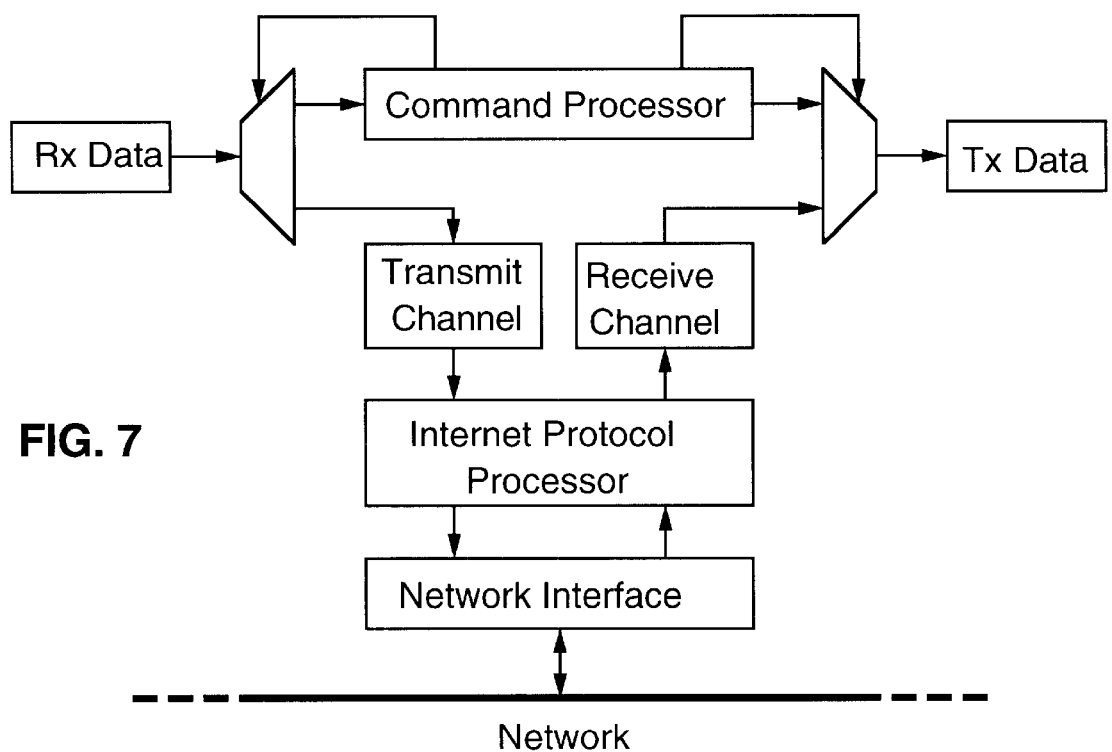
FIG. 7 is a diagram illustrating a programming model used with the API mode of FIG. 6 wherein the network interface chip appears to the device program as a receive data port and a transmit data port.

As shown in FIG. 7, the network interface chip appears to the device program as a receive data port and a transmit data port. The device transmits data to the network interface chip's receive port, and the network interface chip transmits data to the device's receive port. Commands and data are transmitted to the network interface chip's receive data line. Results and data are transmitted from the network interface chip's transmit line.

In Serial Peripheral Mode, the network interface chip is a slave peripheral and implements a command API over the bi-directional serial connection. The device circuit initiates all transactions, although the network interface chip may request attention asynchronously by transmitting an "attention" byte to the host device.

We will now discuss the Parallel Bus Interface between the chip and the device. This interface, like the serial interface just discussed, also has a pass through mode and an API mode. In the pass through mode, illustrated in FIG. 8, the network interface chip 36 simply acts as a bidirectional data port. Bytes written to the network interface chip's transmit register show up at the remote client 30. Bytes sent by the remote client 30 are presented to the device control circuitry 38 through the receive register. Handshake signals are used for data flow control. This mode is most useful for products that already implement a communication protocol over a parallel bus. The network interface chip easily installs into such systems and enables instant networking with no host software changes. Alternatively, a network interface module could be offered for equipment already in the field. This option has the restriction that only one client may be "connected" at a time. If other clients attempt to connect to the device, they will receive a busy response.

Figure 8:
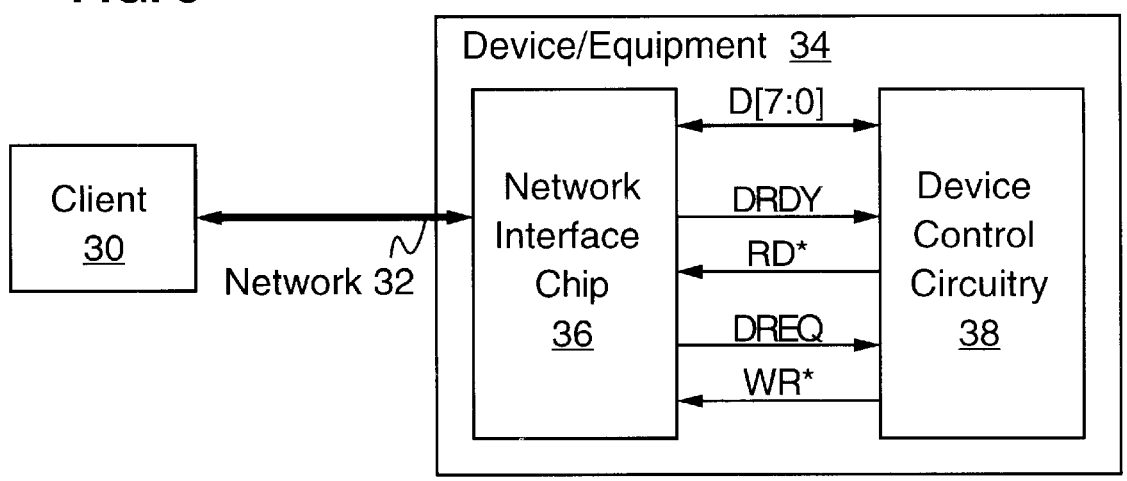
FIGS. 8 and 9 illustrate a parallel bus interface of the present invention operating in a pass through mode (FIG. 8) and an API mode (FIG. 9).

As shown in FIG. 8, the network interface chip 36 appears to the Device Circuit 38 as a bidirectional 8 bit data port. When data is available, the Data Ready (DRDY) signal is asserted. In response, the device asserts the Read line (RD*) which drives the data onto the bus (D[7:0]). If more data is available, the DRDY line will be reasserted after the Read line is de-asserted. Data Request (DREQ) will be asserted anytime the network interface chip is ready to accept a byte of data. To write a byte of data, the device drives the data onto the bus and asserts the Write strobe (WR*). This interface is half-duplex (due to the bidirectional data bus) and the read and write channels are independent. Any number of bytes may be read or written at any time at the discretion of the host device circuit.

Figure 9:
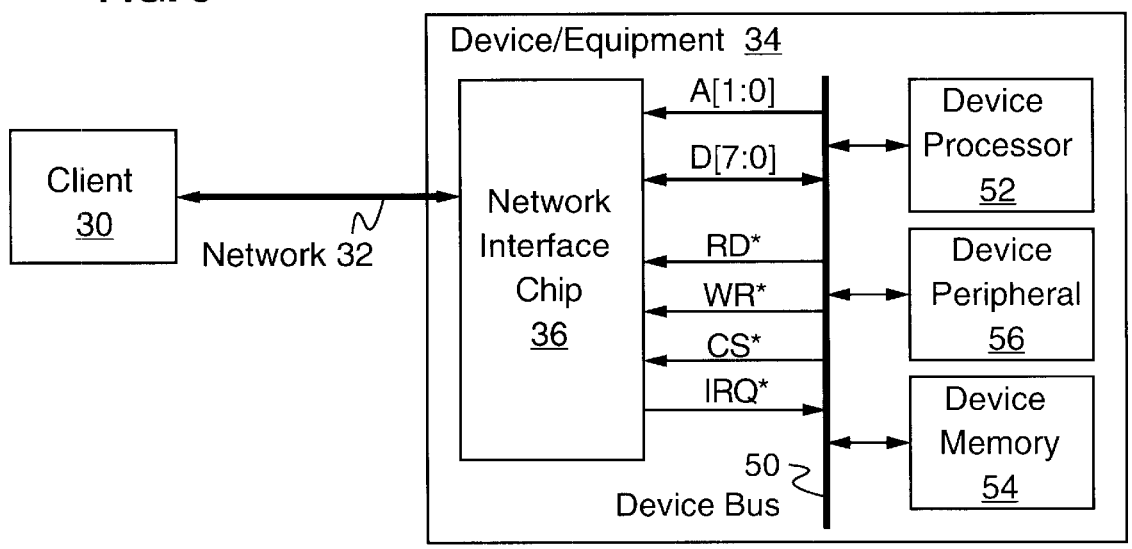

We will now discuss the API mode in relation to FIG. 9. In API mode, it is assumed that the device 34 contains a system bus 50, a device processor 52, device memory 54, and possibly other device peripherals 56 connected to the processor 52 via the bus 50. From the perspective of the processor 52, the network interface chip 36 is simply another slave peripheral device, occupying 4 address locations. Although the bus width is 8 bits, the network interface chip may easily be interfaced to processors with wider buses.

The internal data bus (see FIG. 12) of the network interface chip 36 connects directly to the device data bus 50. If the bus width is more than 8 bits, the lower 8 bits are connected. Address lines A0 and A1 are connected to the 2 low-order address bits of the device bus. Chip Enable (CE*) is generated from the address decode logic. The read and write strobes (RD* and WR*, or E and R/W* for Motorola 68XX microcontrollers) are tied directly to the device bus strobes. The network interface chip will ignore all bus activity unless CE* is asserted.

Optionally, the Interrupt Request line (IRQ) may be connected to the device bus interrupt line. IRQ will be asserted until the interrupt is acknowledged by the device processor. The network interface chip may be run in either interrupt driven or polled mode. For applications requiring large data transfers, the network interface chip will also support an external DMA if one is present in the device. Data Request (DREQ) and Data Ready (DRDY) signals (not shown) are provided for interfacing to a DMA controller. Data Request will be asserted if data can be written to the network interface chip. Data Ready will be asserted when there is data available to be read from the network interface chip.

Figure 10:
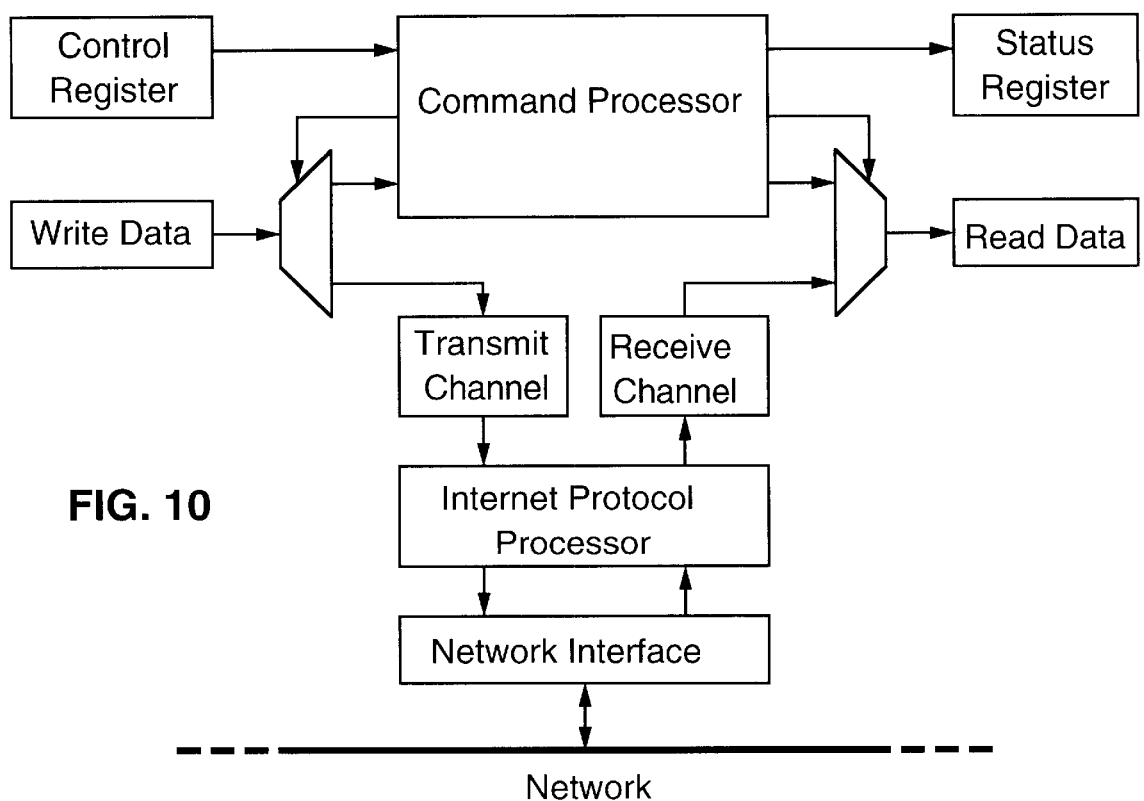
FIG. 10 is a diagram illustrating a programming model used with the API mode of FIG. 9 wherein the network interface chip appears to the application program as four main registers.

As shown in FIG. 10, the network interface chip appears to the application program as four main registers: Read Data, Write Data, Control Register, and Status Register. In addition, there are four interrupt control registers (not shown) which are only used in interrupt driven systems. Internally, the data registers are tied both to the command parser and the network data buffers. The control and status registers are tied to interface and interrupt logic. Commands and transmit data are written to the Write Data register. Results and received data are read from the Read Data register. The Status Register provides information about the interface and command protocol such as interrupts, errors, and handshake signals. The Control Register is used to configure the interface. The interrupt registers (not illustrated) provide interrupt masks, status, and acknowledgement for an interrupt driven system.

Figure 11:
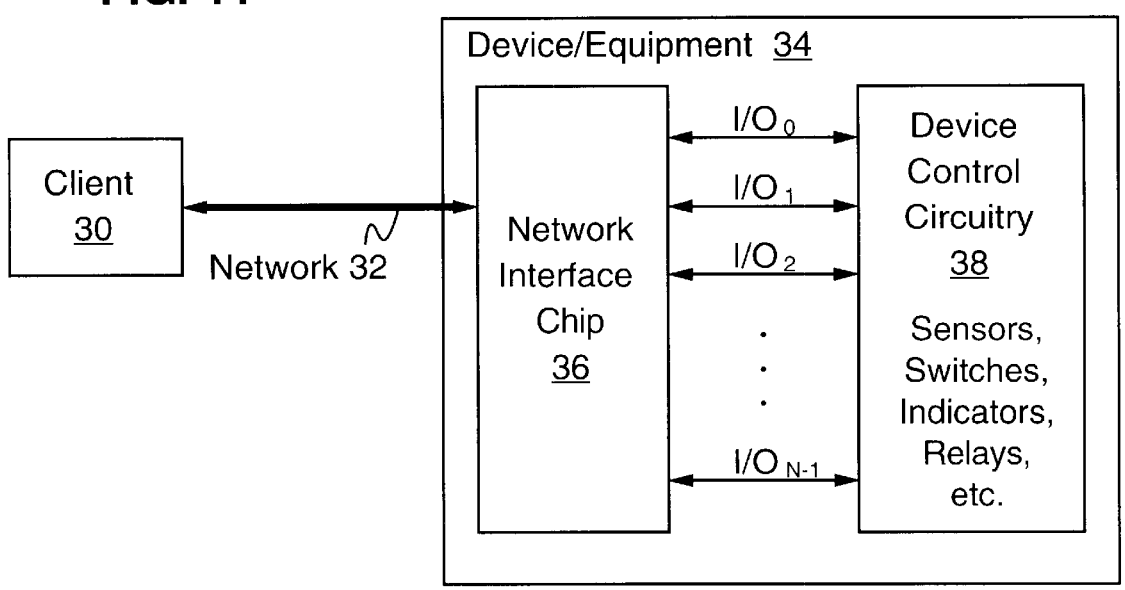
FIG. 11 illustrates a programmable I/O device interface of the present invention.

In Parallel Peripheral Mode, the network interface chip is a slave peripheral and implements a command API over the bi-directional processor bus. The device processor initiates all transactions, although the network interface chip may request attention by asynchronously generating an interrupt. In polled systems, attention is requested through the status register which must be read periodically by the processor. The network interface chip API has many commands to accommodate a wide variety of applications and methods of network interfacing. All of these commands use a common protocol that is simple to understand and use, and requires minimal programming and processor overhead to support. The API is described later in this document. The programmable I/O device interface will now be described in relation to FIG. 11. For systems without a processor, a number N of general purpose digital I/O lines are available for sensing and control. In a preferred embodiment, N=24. Each I/O of the N lines may be configured for input, output, or both. Inputs can be used for sensing switches, level detectors, or other status signals in the device. Lines configured as outputs can be used to drive relays, actuators, indicators, or other components. The remote client 30 has access to these I/O lines over the network 32, as described above. In addition to simple inputs and outputs, some I/O lines may be configured as edge-triggered inputs. Using edge-triggered configuration, an event can be captured until the remote client reads and acknowledges the event. Alternatively, an event may used to send a notification signal or an e-mail message. Each I/O line may be addressed individually, or multiple I/Os may: be grouped and controlled simultaneously as a bus. Although intended for devices without a processor, this interface could also be used with devices that do have a processor, but where there is no need for the network interface chip to interface directly with the processor.

Figure 12:
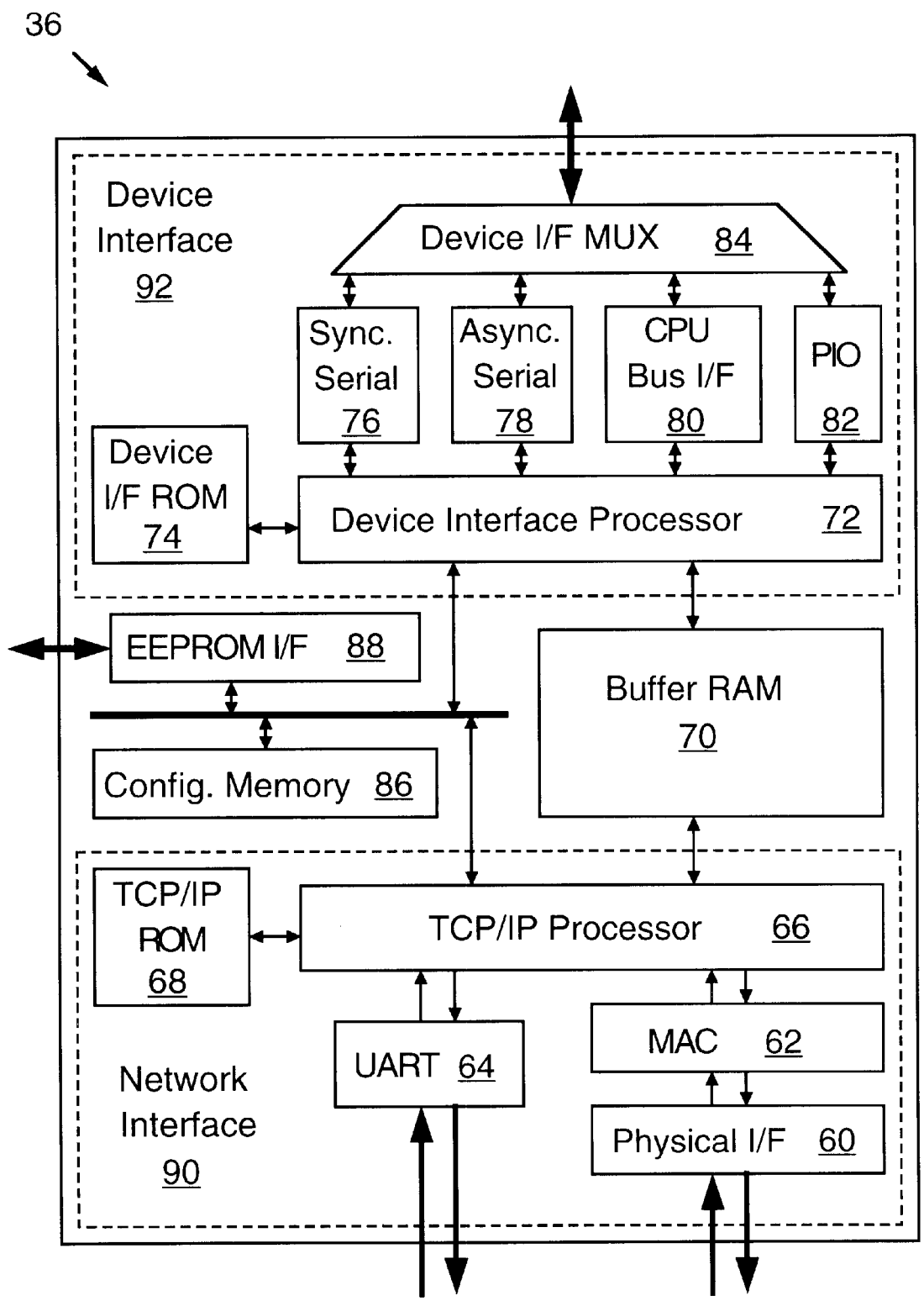
FIG. 12 is a block diagram of a network interface chip according to a preferred embodiment of the present invention.

A block diagram of the network interface chip 36 is shown in FIG. 12. A device interface 92 comprises blocks primarily dedicated to interfacing with the device, while a network interface 90 comprises blocks for interfacing with the network. In the network interface, a physical interface 60 converts between the analog signals on the physical networking medium (RF, wire, optical, etc.) and the digital signals processed by the other blocks of the chip. A media access control (MAC) block 62 appropriately controls access to the physical network. Each type of network (RF, Ethernet, optical, etc.) requires a unique MAC functionality for that network type. Ethernet is the most common media in current use, but the invention is not limited to a particular network type or to a particular MAC technique. A standard universal asynchronous receiver/transmitter (UART) block 64 provides an alternate network connection for using a serial line or modem. The MAC block 62 and UART block 64 exchange raw, unprocessed packets with a TCP/IP processor 66. The TCP/IP processor 66 handles header processing for the MAC, network (IP), and transport (TCP) layers. It also implements the transport layer functions such as packet re-assembly, re-transmit requests for dropped packets, and acknowledgement of received packets. The TCP/IP processor 66 guarantees that all network data is reliably transmitted and received. A TCP/IP ROM 68 contains microcode and data tables required by the TCP/IP processor 66. A buffer RAM 70 is a central repository for data exchange between the TCP/IP processor 66, and a device interface processor 72. In the device interface 92, a device interface processor 72 implements the application layer protocols such as HTTP, SMTP, and FTP. It also implements the API's and control functionality for the device interface, providing a very simple interface to the device, hiding the complexities of network protocols. A device interface ROM 74 contains the microcode which implements the functionality of the device interface processor 72. The interface to the device can be made through one of several interfaces: A synchronous serial interface 76 provides a clocked serial data interface. An asynchronous serial interface 78 provides a fullduplex asynchronous serial interface compatible with RS-232, RS-485, etc. A CPU interface 80 provides a parallel interface to any standard CPU bus. A programmable I/O (PIO) interface 82 provides a set of lines for connecting to sensors, switches, indicators, actuators. In order to reduce the chip pin count, a device interface multiplexer 84 selectively connects one of the interface options to the external pins of the chip. A configuration memory 86 on the chip provides a flash or other non-volatile memory which may be programmed by the user with configuration data, byte code data, and other information specific to a particular application or device. Alternatively, an EEPROM interface 88 allows this data to be stored on an external non-volatile device, such as an EEPROM.

As is evident from the description above, the chip 36 is entirely generic and capable of being customized to interface with any device using any of the various device interfaces described above, and with any client via any of the various network interfaces described above. Thus, this single chip can be inexpensively produced in large quantities for a wide variety of potential applications, and then easily customized for use in specific devices. For example, the same chip is used in a small digital camera as is used in a large industrial machine, the only difference being the specific data and/or instructions stored in the configuration memory 86 and/or in an external EEPROM. For example, the configuration memory 86 and/or the external EEPROM might store an application specific applet customized for the device. The applet for the digital camera might contain a virtual interface to the camera and its internal features, while the applet for the industrial machine might contain a virtual interface to its status and control circuitry.

We will now discuss the initialization of the network interface chip. An advantageous feature of the network interface chip is its ability to automatically initialize itself upon power-on reset. There are three phases of initialization that are performed: hardware interface configuration, internal chip configuration, and network configuration. These are now described more specifically.

Hardware initialization sets up the various hardware interfaces to the chip. This includes the network connection (serial or MII), and the device interface (serial, parallel, or programmable I/O). The hardware initialization is done by sensing the state of certain pins at power-on to determine the system's configuration. Before driving any pins, the chip senses the configuration and configures itself to the compatible mode.

During chip internal configuration, the internal registers and hardware are configured for the device's selected modes of operation. This may be done automatically or under the control of the equipment. In the case of automatic configuration, the chip is initialized using configuration data stored in an internal configuration memory and/or in an external memory (e.g., EEPROM) connected directly to the network interface chip. The chip automatically reads the configuration data from the EEPROM at power-on with no outside intervention. In the case of configuration by the device rather than by an EEPROM, the network interface chip must be operating in the API mode. Upon power-on, the device control circuitry writes commands to the network interface chip in order to initialize it.

The third phase of initialization is network configuration. During network configuration, the network interface chip obtains the necessary configuration parameters to operate on the local IP network. This includes the device's IP address, the router IP address, the subnet mask, and other parameters and boot data as required by the application or the network. These network parameters may be initialized by one of three methods: (1) Static initialization from EEPROM: The network parameters are programmed into the EEPROM and automatically loaded on power-on initialization. (2) Static initialization from the device: The device processor programs the parameters through the API. (3) Dynamic initialization over the network using BOOTP or DHCP: BOOTP and DHCP are standard Internet protocols which allow the network interface chip to obtain network configuration parameters over the network from a BOOTP or DHCP server. This is the most desirable method as it allows the most flexibility. Using this approach, the equipment may be moved to different networks without reprogramming the network parameters.

We now turn to a more detailed description of the API command protocol. The network interface chip API includes many commands for invoking services and transferring data. All of these commands use a common protocol which is designed to be simple to understand and use, and requires minimal programming and processor overhead to support. The protocol operates over a serial interface or a parallel processor bus interface. The protocol is identical for the serial and parallel interfaces, except for minor low-level semantics to address the differences between the interfaces. Each command has an op-code and a fixed number of parameters (or arguments). Each command also returns one or more bytes as the result. Some commands also include a data block transfer. The protocol includes handshakes to ensure the network interface chip and the device remain properly synchronized. The following describes three classes of API available in the network interface chip: monitoring and control API, mail (SMTP) API, and sockets interface API.

In Monitoring and Control mode, the network interface chip uses a very simple protocol for allowing a remote client to access and control variables in the host system, and to make remote function calls. When the remote client makes a request through the Java Applet or HTML control panel, the network interface chip server interrupts the device processor to request a data exchange or function call. The request can be one of the following three types: (1) Value Query: The remote client is requesting the value of a variable. The variable is identified by the network interface chip and the device processor writes the value to the network interface chip. The network interface chip then sends the value to the remote client. (2) Value Set: The remote client wants to change the value of a variable. The variable identifier and the new value is provided by the network interface chip to the device processor. The device processor then changes the value in memory. (3) Function Call: It is also possible for the remote client to call a procedure (i.e., function) in the device's application code and receive the results of the call. The procedure call may include any number of arguments and it may return any number of results. After the request is made using one of these three types, the device processor is notified of a pending request either by interrupt, or by the status register in a polled system. The device processor then issues a command to receive the procedure call reference. After the procedure call, the processor writes the results to the network interface chip.

Using the mail (SMTP) API, the network interface chip can send e-mail messages from the device to one or more recipients. The device can use e-mail transmission for various purposes, e.g., to warn a person if the equipment requires attention or maintenance, or to transmit periodic statistics or data being gathered. E-mail can also be used to transmit device status to a database server which collects and interprets the data in the message and stores it into a database. To send a mail message, the device simply issues the SendMail command to the network interface chip. The recipients, subject, and message text are written to the network interface chip, which then uses SMTP to send the message to the specified recipient(s).

The sockets interface API is used for more sophisticated applications. With this interface., the network interface chip includes a sockets type interface for communication between the equipment processor and the network interface chip. A socket is the basic unit of TCP/IP communication, connecting two devices on separate Internet hosts with a "reliable data stream." Using the sockets interface, any application or higher level protocol may be created on the host device. Most Internet applications are built on top of the sockets interface, including Web servers, Web browsers, e-mail servers and clients, Telnet, and FTP. There are two types of sockets. A client socket is initiated by the device to connect to a known server. A server (or listen) socket is set up to wait for clients to request a connection on a particular port. In socket mode, the network interface chip simply acts as a bi-directional data pipe. Data is transferred between the remote client and the device without intervention or interpretation by the network interface chip. The network interface chip can be configured to automatically open a client or server socket upon power-up. In this case, the device processor only needs to wait for data to be received.

It will be clear to one skilled in the art that the above embodiment may be altered in many ways without departing from the scope of the invention. Accordingly, the scope of the invention should be determined by the following claims and their legal equivalents.

What is claimed is:

1. A single self-contained and autonomous module for directly interfacing device control circuitry of a device to a client machine via a computer network, wherein the chip comprises:

a device interface comprising circuit blocks for communicating digital information between the integrated circuit and the device control circuitry;

a network interface comprising circuit blocks for communicating digital information between the integrated circuit and the computer network; and a non-volatile configuration memory for storing configuration data wherein the internal memory comprises instructions for implementing an API with the device;

wherein the device interface, network interface, and memory are interconnected and perform operations for:
implementing internet protocol functionality on the network;
translating information between network protocol formats and a format of the device;
transferring information between the network and the device control circuitry; and
sending customized software to the client machine over the network, wherein the software is executable on the client machine, and wherein the software enables the client machine to generate device control signals and to receive device status information.

2. The module of claim 1 wherein the configuration memory contains customized device network address information.

3. The module of claim 1 further comprising an external memory interface circuit block.

4. The module of claim 1 wherein the software comprises bytecode instructions executable by a bytecode interpreter running on the client machine, wherein the instructions are customized to characteristics of the device, and wherein the instructions generate on the client machine a virtual interface with the device.

5. The module of claim 1 wherein the device interface comprises an asynchronous serial port, a synchronous serial port, a CPU bus interface, and a programmable input/output port.

6. The module of claim 1 wherein the network interface comprises an ethernet MAC and an asynchronous serial port.

7. The module of claim 1 wherein the internal memory comprises instructions for implementing on the network protocols and functionality of TCP/IP, UDP/IP, FTP, SMTP, and HTTP.

8. The module of claim 1 wherein the network interface comprises a physical interface, a media access control block, a UART, and a TCP/IP processor.

9. The module of claim 1 wherein the configuration memory contains the customized software in the form of bytecode.

10. The module of claim 1 wherein the configuration memory contains customized device interface port protocol information.

11. The module of claim 1 wherein the configuration memory contains instructions for reading customized device interface port protocol information from the device.

* * * * *

UNITED STATES PATENT AND TRADEMARK OFFICE
CERTIFICATE OF CORRECTION

PATENT NO. : 6,446,192 B1
DATED : September 3, 2002
INVENTOR(S) : Subram Narasimhan et al.

It is certified that error appears in the above-identified patent and that said Letters Patent is hereby corrected as shown below:

<u>Column 18,</u>
Line 43, delete "chip" and insert -- module -- therefor.
Lines 46-47, delete "integrated circuit" and insert -- module -- therefor.
Lines 49-50, delete "integrated circuit" and insert -- module -- therefor.

Signed and Sealed this

Sixth Day of April, 2004

JON W. DUDAS
*Acting Director of the United States Patent and Trademark Office*